July 21, 1953 J. W. SPONSLER 2,645,951
CENTER DRILLING FIXTURE
Filed Oct. 5, 1951 2 Sheets-Sheet 1

INVENTOR.
John W. Sponsler
BY *Victor J. Evans & Co.*
ATTORNEYS

July 21, 1953  J. W. SPONSLER  2,645,951
CENTER DRILLING FIXTURE
Filed Oct. 5, 1951  2 Sheets-Sheet 2

INVENTOR.
John W. Sponsler
BY Victor J. Evans & Co.
ATTORNEYS

Patented July 21, 1953

2,645,951

UNITED STATES PATENT OFFICE 2,645,951

CENTER DRILLING FIXTURE

John W. Sponsler, Cambridge, Mass.

Application October 5, 1951, Serial No. 249,858

6 Claims. (Cl. 77—18)

This invention relates to fixtures or jigs used in combination with machine tools and the like, and in particular a fixture or device to facilitate boring a hole or a plurality of holes in the ends of round or rectangular shaped objects with the said hole or holes parallel to the longitudinal axis of said object.

The purpose of this invention is to provide a clamp adapted to be held in the jaws of a bench vise or the like with means for clamping a round or rectangular-shaped object against perpendicularly positioned surfaces whereby with the shank adjacent the chuck end of a hand or electric drill gripped in an extension arm located in superimposed relation to the clamp the center of a drill may be accurately positioned in the center of a round or hexagonally shaped object held in the clamp.

In the conventional type of drill jig or fixture it is difficult to locate the center of a round or hexagonally shaped object and for this reason considerable time is lost in positioning round and hexagonally shaped objects in relation to a point of a drill. With this thought in mind this invention contemplates a clamp in which a round or hexagonally shaped object is forced against diverging side surfaces whereby the center of the object is positioned on a line bisecting the angle between the surfaces so that the position of the object regardless of the diameter is definitely located with the center in the plane bisecting the angle between the surfaces.

The object of this invention is, therefore, to provide means for combining a clamp having angularly disposed flat surfaces with an extension arm having similar surfaces in which a drill held in an extension arm may be definitely located above the center of a piece of material secured in the clamp.

Another object of the invention is to provide a center locating fixture adapted to be used in combination with a hand or electric drill in which the shank of the drill may be clamped in a fixture without changing the drill.

A further object of the invention is to provide a drill, jig or fixture for holding round or hexagonal objects in relation to a drill chuck or shank which is of a simple and economical construction.

With these and other objects and advantages in view the invention embodies a clamp having a base with parallel sides and an opening therethrough and having an offset arm extended from one end with perpendicularly positioned surfaces in the part adjacent to the base and a clamp screw threaded in an extended end and wherein the axis of the clamp screw, longitudinal axis of the base and a line bisecting the angle of the said perpendicularly disposed surfaces are in a common plane, and an extension arm carried by a pin positioned to extend through the opening in the base of the clamp and also having a clamp screw positioned to coact with perpendicularly disposed surfaces wherein the extension arm is adapted to position the shank of a drill in alignment with a round or hexagonal object secured in the clamp.

Other features and advantages of the invention will appear from the following description taken in connection with the drawings wherein.

Figure 1:
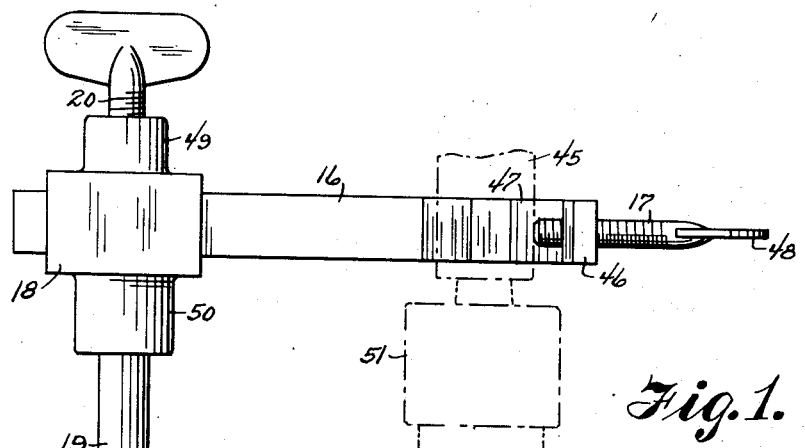
Figure 1 is a side elevational view of the fixture showing the extension arm positioned above the clamp and showing the end of a round bar and also the chuck of a drill in dotted lines and with the parts positioned in the clamp and the extension arm, respectively.

Referring now to the drawings wherein like reference characters denote corresponding parts the improved center drilling fixture of this invention includes a clamp having a base 10 with an offset arm having angularly disposed walls 11, 12, 13 and 14, and a clamp screw 15 threaded in the wall 14, and a drill extension arm 16 having a clamp screw 17 and secured in a guide housing 18 on a rod 19 by a thumb screw 20.

The base 10 of the clamp is provided with flat parallel sides 21 and 22 to facilitate gripping the clamp with the jaws of a bench vise or the like and the walls 11 and 12 which extend from one end of the base are positioned perpendicular or at a right angle to each other. The base is also provided with an opening 23 that is positioned to receive the rod 19.

The wall 13 is also positioned perpendicular to the wall 12 and the walls 12 and 13 are reinforced by a web 24.

The wall 14 is provided with a recess 25 in the upper end which extends from a ledge 26 that is positioned in a vertical plane bisecting the angle between the walls 11 and 12 and a similar recess 27 is provided on the upper end of the wall 11 whereby the line or ledge 28 is provided at the intersection of the walls 11 and 12 and this line is also positioned in the plane bisecting the angle between the walls 11 and 12.

The plane, as indicated by the numeral 29 bisects the angle between the inner surfaces 30 and 31 of the walls 11 and 12 and extends through the axis of the thumb or clamp screw 15 and also through the center of the opening 23. With a cylindrical or hexagonally shaped object, as indicated by the dot and dash lines 32 held against the surfaces 30 and 31, the center of the object is positioned in the plane 29 and a line marked by a scribing tool on the end of the object is in a straight edge held against the ledges 26 and 28 and will extend through the center of the object and will mark the diameter thereof.

Figure 5:
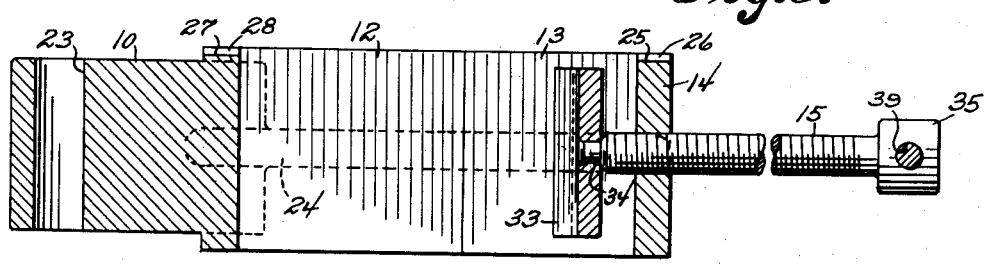
Figure 5 is a longitudinal section through the clamp taken on line 5—5 of Figure 4.
Figure 6:
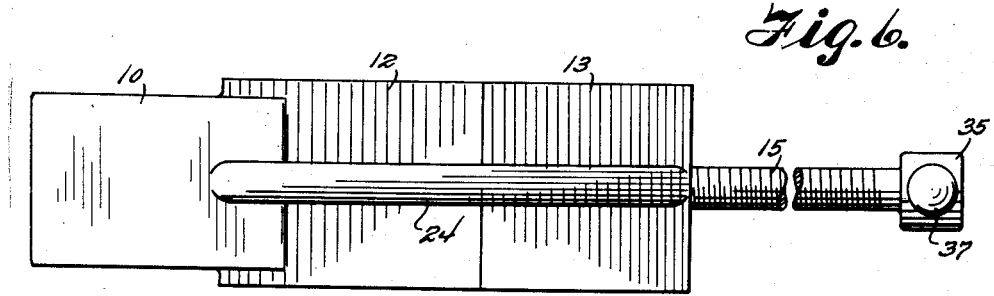
Figure 6 is a side elevational view of the clamp looking toward the closed side thereof.
Figure 7:
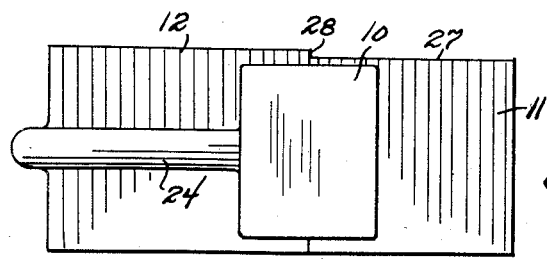
Figure 7 is an end elevational view of the clamp looking toward the base thereof.

The inner end of the clamp screw 15 is provided with a V-shaped pad 33 which is mounted on a pin 34 at the end of the screw and with the end of the pin peened over, as shown in Figure 5, the pad is held on the screw and the screw is free to rotate. The screw 15 is provided with a head 35 and a pin 36 with knobs 37 and 38 on the ends is slidably mounted in an opening 39 in the head.

Figure 2:
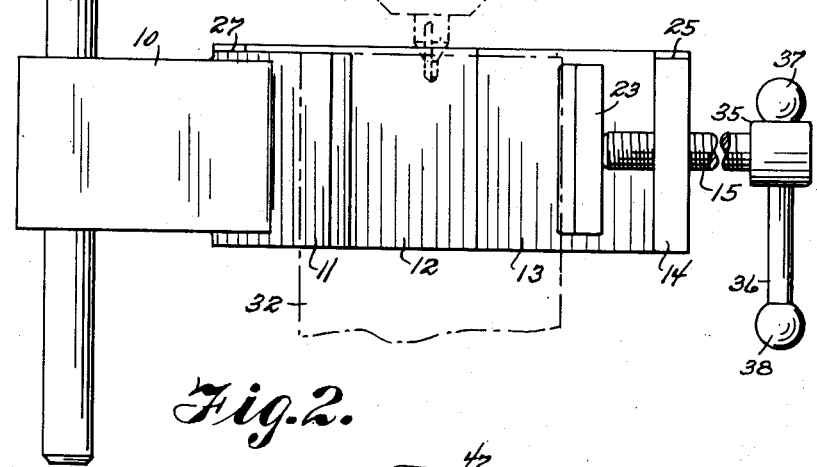
Figure 2 is a plan view of the said extension arm with other parts omitted.
Figure 3:
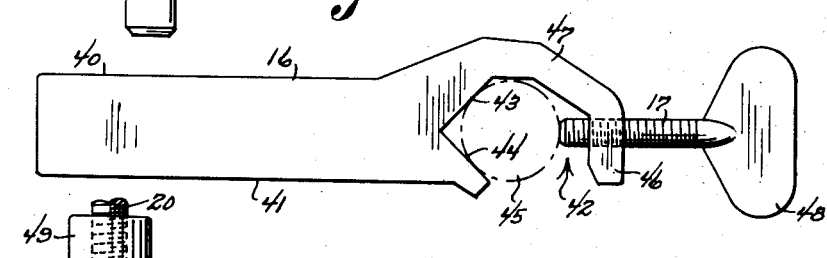
Figure 3 is an end elevational view showing the extension arm supporting member.
Figure 4:
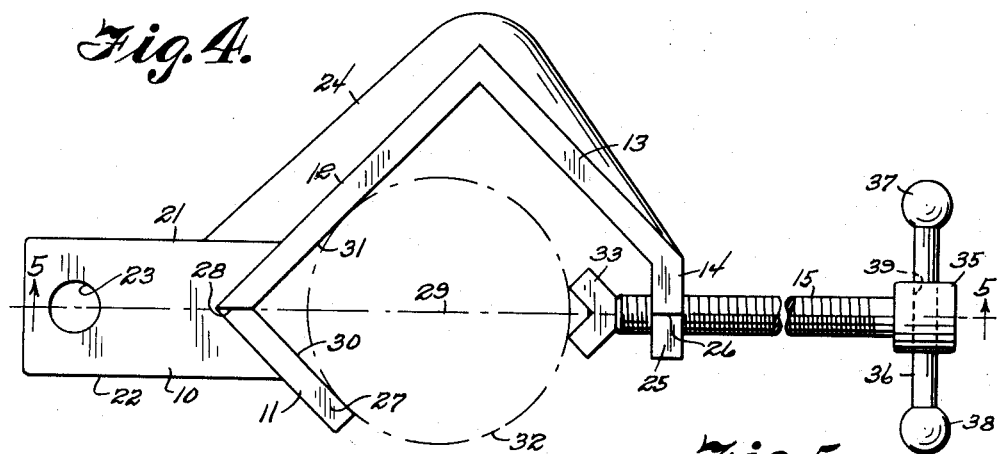
Figure 4 is a plan view of the clamp, showing a round bar secured therein as indicated by the dot and dash lines.

The extension arm 16 is formed particularly as illustrated in Figure 2 with parallel side surfaces 40 and 41 and with a socket 42 in one end. The inner part of the socket is formed with right angularly positioned flat surfaces 43 and 44 and a shank of a drill, as indicated by the dot and dash lines 45 is clamped against the surfaces 43 and 44 by the clamp screw 17 which is threaded in an extension 46 of a finger 47 extended from the extension arm. The screw 17 is provided with a flat head 48 by which it may be rotated by hand.

The extension arm is slidably mounted in the guide housing 18 and the arm is clamped in adjusted position by the set screw 20 which is threaded in a hub 49 on the upper side of the housing. The lower side of the housing is provided with a similar hub 50 in which the rod 19 is secured.

With the parts arranged in this manner the rod 19 is positioned in the opening 23 of the base 10 and with a cylindrical bar or object 32 clamped against the surfaces 30 and 31 the center of the bar may readily be determined and marked with a center punch.

With a shank of a hand or electric drill clamped in the extension arm 16 a center point or drill in a chuck, as indicated by the dot and dash line 51, may be moved over the center of the work piece or bar 32 until the center registers with the center of the bar or work piece. Using a center punch depression in the bar 32 as the pivot point the drill may be moved back and forth until the rod 19 does not bind in the opening 23 and where the extension arm 16 does not bind in the guide housing 18. At this point the set screw 20 is tightened and the hole bored. The hole or the plurality of holes drilled in this manner will be parallel with the longitudinal axis of the bar or work piece.

With parts arranged as in Fig. 1 the work piece can be positioned so that the drill extends in a plane coincident with vertical axis of the work piece or in a plane coincident with the horizontal axis of the work piece. As the hole is bored the tool will travel the vertical or horizontal axis as the hole is bored, the rod 19 sliding in the opening 23 to properly aline the tool and the center of the work piece. The feeding relation between the tool and work piece depends upon the pressure applied to the tool and the rapidity of cut of the drill to the desired depth.

It will be understood that modifications may be made in the design and arrangement of the parts without departing from the spirit of the invention.

What is claimed is:

1. A center drilling fixture comprising a base with an opening therethrough and having an arm extended from one end with perpendicularly disposed surfaces positioned at the intersection of the base and arm, a clamp screw threaded in the extended end of the arm, the axis of said clamp screw positioned in a plane bisecting the angle between the perpendicularly disposed surfaces and extended longitudinally through the base and also positioned on the axis of the opening through the base, a rod extended through the opening through the base for sliding motion in relation to said base, an extension arm adjustably mounted on said rod at right angles thereto and having a clamp screw thereon for clamping the arm on a shank of a drill.

2. A center drilling fixture comprising a base with an opening therethrough and having an arm extended from one end with perpendicularly disposed surfaces positioned at the intersection of the base and arm, a clamp screw threaded in the extended end of the arm, the axis of said clamp screw positioned in a plane bisecting the angle between the perpendicularly disposed surfaces and extended longitudinally through the base, a rod extended through the opening through the base in perpendicular relation to the base and for sliding movement relative to the plane of the base, an extension arm slidably mounted on said rod for lateral adjustable movement in relation to said rod and having a clamp screw thereon for clamping the arm on a shank of a drill.

3. A center drilling fixture as described in claim 1, in which the extension arm is secured in the adjusted position in relation to the rod with a set screw in engagement with said arm.

4. In a center drilling fixture as described in claim 2, means adjustably securing the said extension arm in adjusted positions on the rod.

5. A center drilling fixture as described in claim 2, wherein the extension arm is provided with a socket having flat surfaces therein and one surface is positioned at a right angle in relation to the other and also having a clamp screw threaded in the end thereof with the clamp screw positioned in a plane bisecting the said right angle between the flat surfaces of the extension arm.

6. In a center drilling fixture the combination which comprises a horizontally disposed base having parallel sides adapted to be gripped in a bench vise said base having an opening extended therethrough and an arm extended therefrom and also having perpendicularly disposed flat surfaces positioned at the intersection of the base and arm, a clamp screw having a pad on the inner end and a head on the outer end threaded in the outer end of the arm and positioned in a plane bisecting the angle between the flat surfaces positioned at the intersection of the base and arm, a rod positioned in the opening extended through the base in perpendicular relation to the plane of the base and for sliding movement relative to the plane of the base, a guide housing positioned at the upper end of the rod, an extension arm having a drill shank receiving socket in the outer end slidably mounted in the guide housing for lateral adjustable movement in relation to said housing, a clamp screw threaded in the outer end of the extension arm and positioned in a plane bisecting the right angularly disposed surfaces formed in one side of the socket thereof, and a set screw threaded in said guide housing for engaging the extension arm for clamping the extension arm in said socket thereof.

JOHN W. SPONSLER.

References Cited in the file of this patent

UNITED STATES PATENTS

| Number | Name | Date |
|---|---|---|
| 140,451 | Amidon | July 1, 1873 |
| 579,037 | Bulock et al. | Mar. 16, 1897 |
| 1,794,149 | Collins | Feb. 24, 1931 |
| 2,561,914 | Douglass | July 24, 1951 |